(12) United States Patent
Koike et al.

(10) Patent No.: US 6,672,525 B2
(45) Date of Patent: Jan. 6, 2004

(54) FISHING GEAR

(75) Inventors: Mamoru Koike, Saitama (JP); Manabu Matsuhashi, Tokyo (JP)

(73) Assignee: Daiwa Seiko, Inc., Tokyo (JP)

( * ) Notice: Subject to any disclaimer, the term of this patent is extended or adjusted under 35 U.S.C. 154(b) by 25 days.

(21) Appl. No.: 10/166,125

(22) Filed: Jun. 11, 2002

(65) Prior Publication Data

US 2002/0185561 A1 Dec. 12, 2002

(30) Foreign Application Priority Data

Jun. 12, 2001 (JP) ..................... P2001-176482

(51) Int. Cl.[7] .............................................. A01K 89/01
(52) U.S. Cl. ...................................................... 242/231
(58) Field of Search ................. 242/231, 232; D22/141

(56) References Cited

U.S. PATENT DOCUMENTS

| 3,670,984 | A | * | 6/1972 | Lemery | 242/231 |
|---|---|---|---|---|---|
| 5,149,006 | A | * | 9/1992 | Hitomi | 242/231 |
| 5,839,681 | A | * | 11/1998 | Kaneko | 242/231 |
| 6,186,429 | B1 | * | 2/2001 | Cockerham | 242/231 |
| 6,371,395 | B2 | * | 4/2002 | Sato | 242/232 |
| 6,382,540 | B1 | * | 5/2002 | Takikura et al. | 242/231 |

* cited by examiner

Primary Examiner—Emmanuel Marcelo
(74) Attorney, Agent, or Firm—Sughrue Mion, PLLC

(57) ABSTRACT

A fishing gear in which an attached part (8) is assembled onto a main body member (6) formed of a base metal protected by an insulating coating, characterized in that a fixing member (20) for attaching and fixing the attached part to the main body member (6) is formed of an aluminum alloy in which an Fe component is 0.6 wt. % or less, a Cu component is 0.2 wt. % or less, an Ni component is 0.1 wt. % or less, and a Ti component is 0.03 wt. % or less.

12 Claims, 8 Drawing Sheets

FISHING GEAR

BACKGROUND OF THE INVENTION

The present invention relates to a fishing gear for use on seashore, such as a fishing reel.

In the case of fishing gears such as fishing reels, in order to improve the maneuverability and enhance the strength, their main body portions are generally formed of base metals such as an aluminum alloy and a magnesium alloy so as to realize light weight and high rigidity. In addition, fishing gears are often used near a sea such as on a rocky beach or a boat, and in the case where the main body portion is formed of a base metal as described above, it has been an essential requirement in construction to form an insulating coating on its surface so as to prevent electric corrosion.

Various attached parts are generally attached to the main body portion of the fishing gear, which is constructed as described above, by fixing members such as screws and rivets formed of stainless steel, iron, or brass in association therewith.

As described above, in the case where the main body portion is formed of a base metal, an insulating coating is generally formed on its surface. Since such an insulating coating is formed on the surface of the portion where the fixing member is attached (e.g., the surface of an internally threaded portion), it has been thought that corrosion (electric corrosion) due to the potential difference does not occur between such two members.

However, there are some cases where corrosion occurs between the fixing member and the main body portion. This is attributable to the fact that the insulating coating formed on the surface of the base metal is undesirably peeled off during the operation of attaching the fixing member, and the potential difference can occur due to this cause, resulting in the electric corrosion.

The present inventors conceived of the invention upon finding that the insulating film is likely to be peeled off during such an operation of attaching the fixing member, and that there arises the problem that electric corrosion occurs on the main body member side due to this cause.

Meanwhile, since the fishing gear is frequently used on places where the foothold is unstable, such as a rocky beach and a boat, and the fishing gear is used in environments where it is easily damaged by being dropped by mistake, in order to effectively prevent damage and deformation, a high-strength member in which the surface of a base material formed of a precious metal such as stainless steel, a metal, or a resin is provided with the surface treatment of a precious metal such as chromium plating, nickel plating, or the like is generally used for a damage-prone portion as a protective member (attached part) of the main body member.

Incidentally, when the protective member in which the precious metal is used and the main body portion formed of a base metal are combined (assembled), the potential difference between the two members becomes large, so that electric corrosion occurs. However, the occurrence of such electric corrosion is prevented by means of an insulating coating formed on the aforementioned base metal surface or by separately interposing an insulating member between them.

Nevertheless, despite the above-described electric corrosion preventing structure, the present situation is such that, depending on handling, electric corrosion can occur even in the fishing gear in which the two members are combined (assembled).

The invention has been devised by focusing on such problems, and its object is to provide an arrangement for effectively preventing electric corrosion in the fishing gear in which a member (also referred to as an attached part) formed of a precious metal is assembled onto a member (also referred to as a main body member) formed of a base metal.

SUMMARY OF THE INVENTION

The object of the invention is to provide an arrangement for effectively preventing electric corrosion on the main body member side in the fishing gear in which an attached part is attached to a main body member formed of a base metal, by using a fixing member such as a screw.

Another object is to provide an arrangement for effectively preventing electric corrosion in the fishing gear in which a member (also referred to as an attached part) formed of a precious metal is assembled onto a member (also referred to as a main body member) formed of a base metal.

To solve the above-described problems, in accordance with the invention there is provided a fishing gear in which an attached part is assembled onto a main body member formed of a base metal protected by an insulating coating, characterized in that a fixing member for attaching and fixing the attached part to the main body member is formed of an aluminum alloy in which an Fe component is 0.6 wt. % or less, a Cu component is 0.2 wt. % or less, an Ni component is 0.1 wt. % or less, and a Ti component is 0.03 wt. % or less.

As the fixing member is formed of an aluminum alloy which is a base metal, even if the insulating coating of the main body member formed of a base metal is peeled off, the potential difference between the main body member and the fixing member is small, so that it is possible to suppress electric corrosion of the main body member. In this case, however, if components of iron, copper, nickel, titanium, and the like, which are components added as the aluminum alloy, increase, the tendency of occurrence of electric corrosion between the alloy components and the base metal of the main body member becomes strong. Therefore, the weight percentage of the respective added components mentioned above is at least set within the above-described ranges. It should be noted that not all the aforementioned added components may be included, and the percentage of some components may be 0 wt. %.

The inventors surmised that the cause of occurrence of electric corrosion lies in the fixing member such as a screw or a rivet which is used when the attached part formed of a precious metal is assembled to the main body member formed of a base metal, and conducted the following test.

A main body member (here a rotor portion of the fishing reel) was formed of a base metal coated with an insulating coating on its surface, and an attached part provided with surface treatment with a precious metal was attached to it by means of a fixing member (screw) made of stainless steel, iron, brass, or the like, which is generally used. In this case, an internally threaded portion was formed in the main body member, and an insulating coating was formed on the surface of this internally threaded portion as well. Then, scorings and pinholes were provided in advance at arbitrary portions of the main body member, and when a saline-water spraying test was performed, the results obtained were such that corrosion advanced appreciably in the scored portions and the pinhole portions in a period of about 20 days.

As the cause for the appreciable advance of such corrosion, it is conceivable that in a case where the fixing member for fixing the two members is formed of a precious metal, at the time of the usually performed operation of attaching the fixing member, the insulating coating formed on the surface of the internally threaded portion is peeled off, with the result that the fixing member and the base metal member (main body member) are electrically connected, thereby forming a circuit through which electrons flow. Namely, once the insulating coating is peeled off, saline water becomes attached to the aforementioned pinhole portions and to the fixing member, thereby undesirably forming a circuit through which electrons flow in the route including: "saline water—pinhole (score)—base metal—fixing member—saline water." Moreover, since the flow of electrons occurs constantly, the advance of corrosion does not stop, causing the occurrence of large electric corrosion in the pinhole portions and the scored portions.

On considering that the above-described drawback could be overcome by forming the fixing member of a base metal, the fixing member was replaced with one made of a base metal, and the aforementioned test was performed again, but the results were such that electric corrosion still occurred.

This is conceivably attributable to the fact that at the time of the operation of attaching the base metal-made fixing member for assembling the precious metal-made attached part onto the main body member, the insulating coating formed on the surface of the internally threaded portion of the main body member is peeled off in the same way as described above, and that the fixing member electrically connects the attached part surface-treated with a precious metal and the main body member, thereby producing a potential difference. As such, if saline water is attached to the attached part as well as the pinhole portions and the scored portions, a circuit through which electrons flow is undesirably formed in the route including: "saline water—pinhole (score)—base metal—fixing member —saline water." Consequently, in the same way as described above, large electric corrosion conceivably occurs in the pinhole portions and the scored portions.

Accordingly, on the basis of the results of the above-described tests, the inventors prepared test pieces in each of which the attached part was fixed to the main body member by using the screw (fixing member) formed of a base metal-base material, and an insulating member was interposed between the screw and the attached part, and conducted a similar saline-water spraying test was performed. Then, the results were obtained in that advance of electric corrosion was not observed in the pinhole portions.

On the basis of the details discovered through the above-described tests, the inventors provide a fishing gear in which electric corrosion is difficult to occur by providing an arrangement such that when the attached part formed of a precious metal is assembled by a fixing member onto the main body portion formed of a base metal protected by an insulating coating, the circuit through which electrons flow is not formed even if the insulating coating is peeled off.

Namely, in accordance with the invention there is provided a fishing gear in which an attached part formed of a precious metal is assembled onto a main body member formed of a base metal protected by an insulating coating, characterized in that a fixing member for attaching and fixing the attached part to the main body member is formed of abase metal, and an insulating portion for insulating electrical conduction is provided between the fixing member and the attached part.

DETAILED DESCRIPTION OF PREFERRED EMBODIMENTS

Referring now to the appended drawings, a description will be specifically given of an embodiment of the fishing gear in accordance with the invention.

FIRST EMBODIMENT

Figure 1:
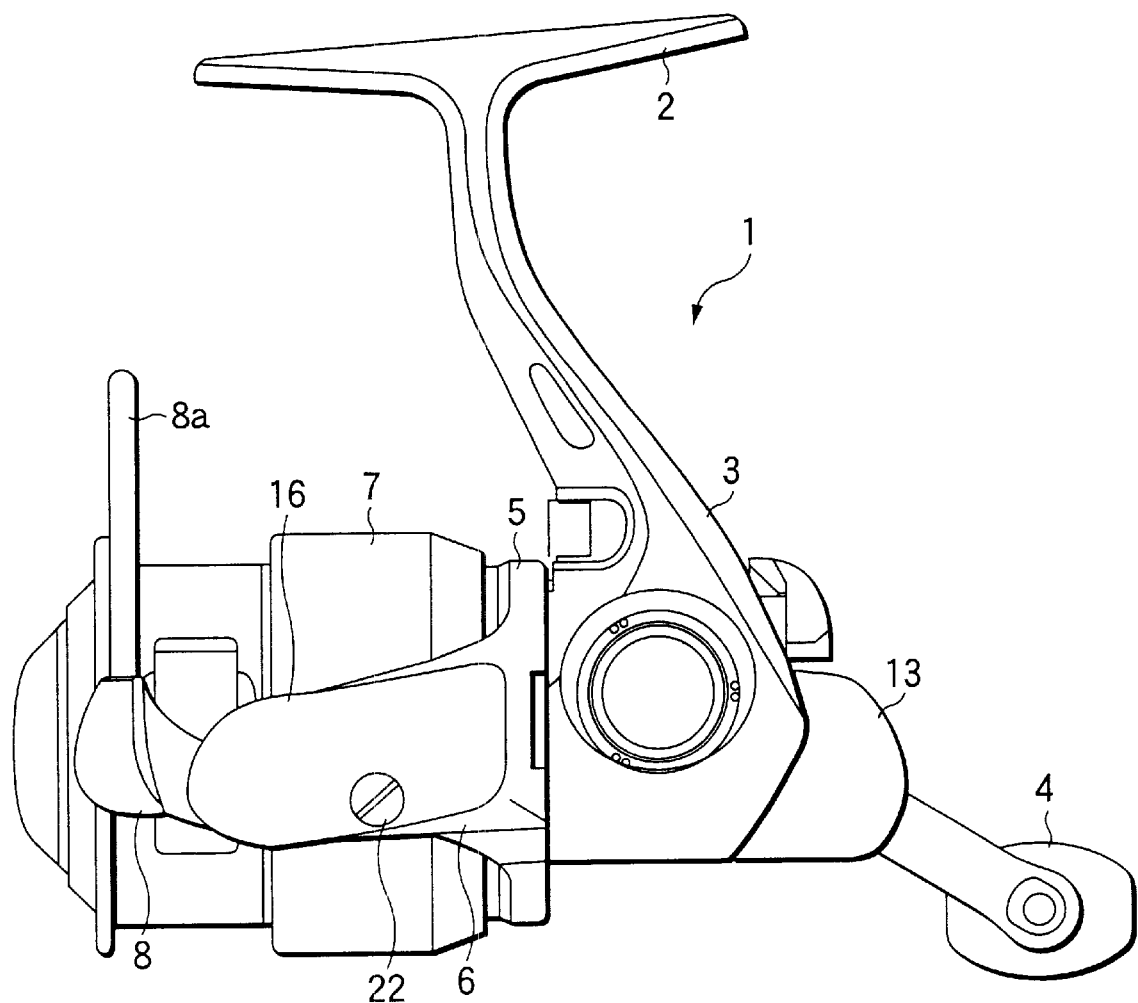
FIG. 1 is a side elevational view of a fishing spinning reel, illustrating an embodiment of a fishing gear in accordance with the invention.

FIG. 1 illustrates a fishing reel (spinning reel) around which a fishing line is wound and held according to a first embodiment of the invention.

A fishing reel 1 includes a reel body 3 having a reel leg 2, a rotor 5 disposed in front of the reel body 3 which is rotatable and driven by the winding operation of a handle 4, and a spool 7 which is moved back and forth between a pair of bail supporting arms (only one is shown) 6 provided on the rotor 5, by the winding operation of the handle 4. Each of a pair of bail supporting member 8, to which each proximal end of a bail 8a is fixed, is rotatably supported by each bail supporting arm 6, and a fishing line guide member (not shown) is provided on one bail supporting member 8.

As the handle 4 is operated, the fishing line is wound uniformly and held around the spool 7, which is moved back and forth, by the fishing line guide member which rotates together with the rotor 5.

Figure 2:
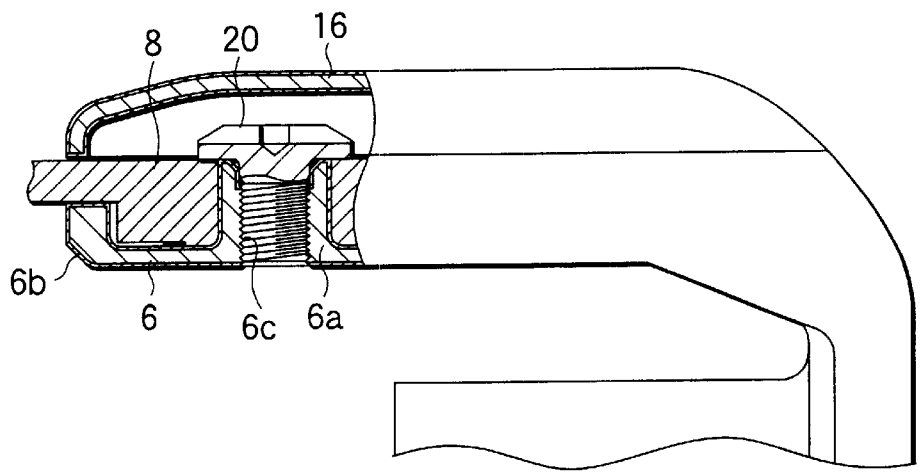
FIG. 2 is a cross-sectional view illustrating a structure for mounting a bail supporting member which is rotatably supported by a bail supporting arm of the fishing spinning reel shown in FIG. 1.
Figure 3:
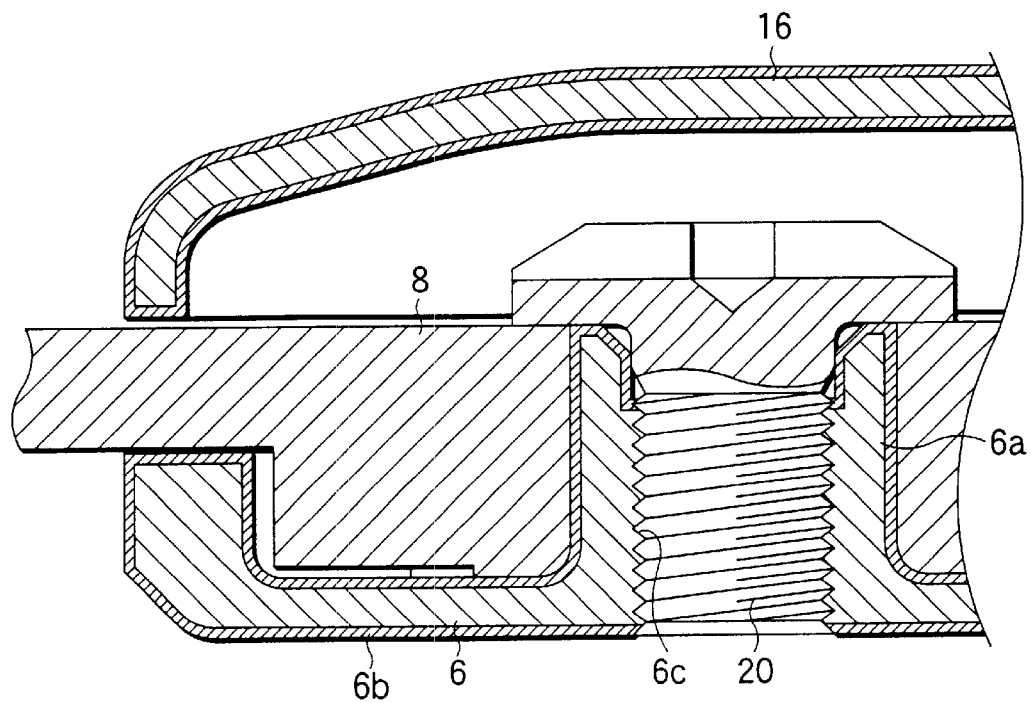
FIG. 3 is an enlarged view of the mounting structure shown in FIG. 2.

In the above-described construction, each bail supporting member 8 is formed of a resin or the like, and is rotatably supported by the bail supporting arm 6 through a screw (fixing member) 20, as shown in FIGS. 2 and 3. Namely, a holding portion 6a, in which an internally threaded portion 6c is formed, is formed on and projected from the bail supporting arm 6, and an engaging portion formed on the bail supporting member 8 is disposed on this holding portion 6a. As the screw 20 is fitted in the internally threaded portion 6c, the bail supporting member 8 is rotatably supported by the bail supporting arm in such a manner as to be prevented from coming off.

The above-described bail supporting arm 6 is formed of a base metal such as an aluminum alloy or a magnesium alloy integrally with the rotor 5 so as to realize light weight and high rigidity, and an insulating coating 6b is formed on its surface. In addition, this insulating coating 6b is formed on the surface portion of the aforementioned internally threaded portion 6c into which the screw 20 is threadedly inserted.

In such an attaching structure, the screw 20 is formed of an aluminum alloy which is a base metal similar to the material of the bail supporting arm (an insulating layer may be formed on the surface of the screw 20). In this case, as the aluminum alloy, components including iron, copper, nickel, titanium, and the like are added. The ratio of addition of the respective components is set such that the Fe component is 0.6 wt. % or less, the Cu component is 0.2 wt. % or less, the Ni component is 0.1 wt. % or less, and the Ti component is 0.03 wt. % or less. As preferable materials of such alloys, it is possible to specifically cite an A 5056 alloy, an A 5052 alloy, and the like in the JIS Standards.

Alternatively, a zinc alloy, a magnesium alloy, a resin, or the like may be used instead of the aforementioned aluminum alloys.

If the screw 20 which comes into contact with the bail supporting arm 6 is formed of an aluminum alloy which is a base metal, and the ratio of various components added is set as described above, it is possible to prevent electric corrosion between the bail supporting arm 6 and the screw 20. In addition, at the time of such as the operation of attaching the screw 20, even if the insulating coating 6b formed on the surface of the bail supporting arm 6 is peeled off and the two members come into direct contact with each other, since the potential difference between them is small, it is possible to reduce electrical conduction. Consequently, it becomes possible to prevent the electric corrosion of the bail supporting arm 6 which is a member formed of a base metal.

As the material of the base metal for forming the bail supporting arm 6 constituting the aforementioned main body member, it is possible to use a metal which exhibits a large ionization tendency, e.g., magnesium, aluminum, a magnesium alloy, an aluminum alloy, or the like. However, it is preferable to use a magnesium alloy among these materials. Namely, the magnesium alloy, although exceptionally lightweight among base metals, has conventionally been difficult to use for a fishing gear since electric corrosion is likely to occur. However, by providing the above-described arrangement, it becomes possible to effectively prevent electric corrosion. Consequently, it is easily possible to construct a fishing reel which is lightweight and has high rigidity and high durability, and it becomes possible to substantially alleviate the burden on an angler.

The fishing reel is frequently used on places where the foothold is unstable, such as a rocky beach and a boat, and the fishing reel is used in environments where it is easily damaged by being dropped by mistake, in order to effectively prevent damage and deformation, a high-strength member in which the surface of a base material formed of a precious metal such as stainless steel, a metal, or a resin which is provided with the surface treatment of a precious metal such as chromium plating, nickel plating, or the like is generally used for a damage-prone portion as a protective part of the main body member. (For example, in the spinning reel shown in FIG. 1, a protective part 13 is attached to a rear end portion of the reel body 3, and a protective part 16 is attached to the surface of each bail supporting arm 6.)

However, the protective part in which the aforementioned precious metal is used is likely to undergo electric corrosion since such a protective part exhibits a large potential difference with the main body member formed of a base metal. Namely, even if the protective part is fitted by using a screw 22 formed in the same way as described above, the screw 22 and the protective part come into contact with each other and conduct, so that a large potential difference occurs between the main body member and the protective part. Therefore, if there is damage or the like on the main body member, there is a possibility that corrosion advances from that portion.

For this reason, when the aforementioned protective parts 13 and 16 are attached by using the screws 22 formed in the same way as the screw 20, an insulating portion for insulating electrical continuity between the screw 22 and each of the protective parts 13 and 16 is preferably provided between these members. Specifically, it suffices if a means is provided such that a resin collar (resin washer) is interposed between a rear surface of the head of the screw 22 and the surface of the protective part, or a resin coating or a rubber coating is provided for the portion of the surface of the protective part with which the screw 22 comes into contact, or an adhesive having an insulating function is allowed to flow between the two members.

With the structure in which the aforementioned protective parts 13 and 16 are attached, it is preferable to further interpose an insulating member between the main body member formed of a base metal and the protective part. By interposing such an insulating member, it is possible to avoid scoring which can occur in assembling them, thereby making it possible to prevent electric corrosion reliably.

Although a description has been given of the embodiment of the invention, the invention is not limited to the above-described embodiment, and various modifications are possible.

For example, although the fixing member is constructed as a screw, the fixing member may be alternatively constructed as a rivet, for example. In addition, the invention is also applicable to fishing gears such as a fishing rod and a fishing-rod holder other than the fishing reel. Furthermore, the main body member and the attached part in the invention are merely defined in the connection between a member formed of a base metal and a part which is attached thereto, and should not be defined by the nomenclature of the components which make up the fishing gear.

SECOND EMBODIMENT

Figure 4A:
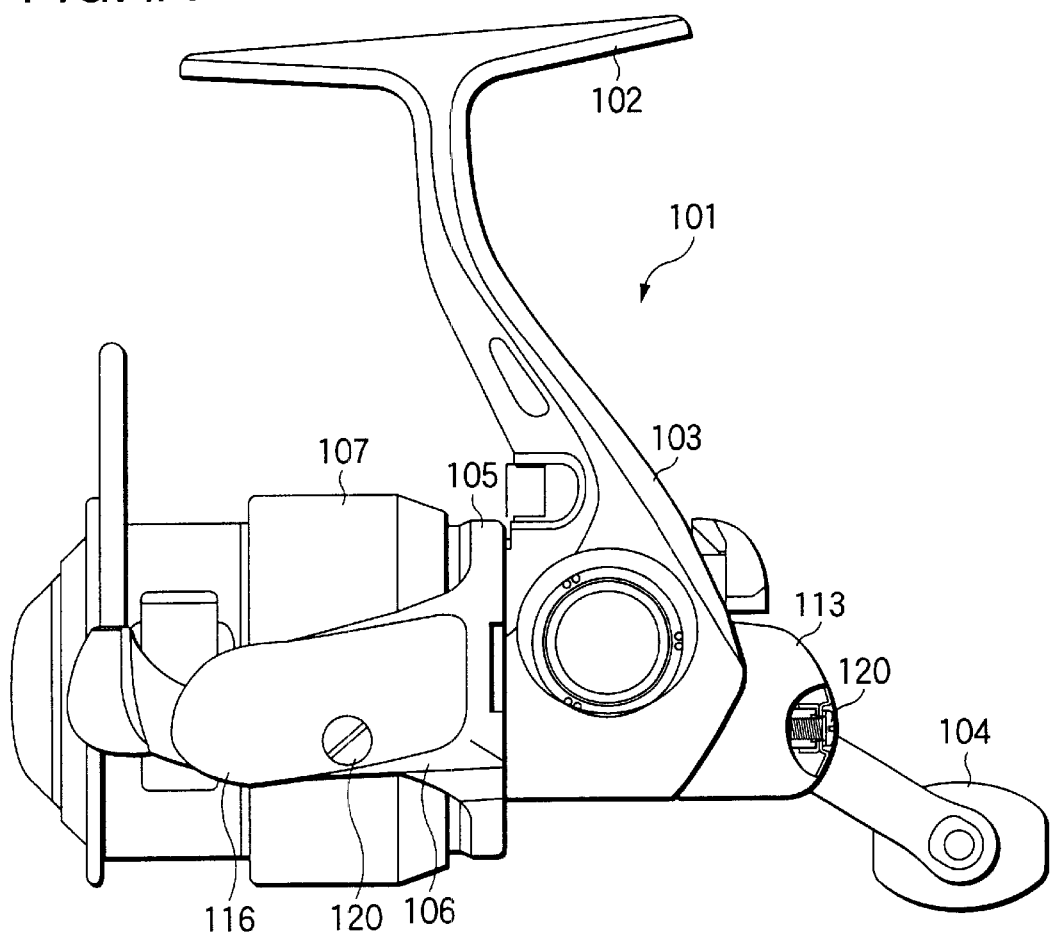
FIG. 4A is a side elevational view of a fishing spinning reel, illustrating an embodiment of a fishing gear in accordance with the invention.

FIG. 4A illustrates a fishing reel (spinning reel) around which a fishing line is wound and held according to a second embodiment of the invention. Generally, the fishing reel is frequently used on the rocks near seawater or on a boat or the like, and is used in environments in which it is easily subjected to damage or the like in a case where it is dropped by mistake. In addition, as for the recent fishing reels, their main body portion is formed of a base material such as an aluminum alloy or a magnesium alloy to realize light weight and high rigidity, and a protective member (attached part) which is formed of a precious metal or in which a metal, a resin, or the like is coated with a precious metal is attached, as required, to a damage-prone portion. For this reason, the fishing reel is a tool in which electric corrosion is particularly likely to occur, as described above, among the fishing gears. However, by providing the following construction, the occurrence of such electric corrosion is effectively prevented.

A fishing reel 101 includes a reel body 103 having a reel leg 102, a rotor 105 disposed in front of the reel body 103 which is driven and rotated by the winding operation of a handle 104, and a spool 107 which is moved back and forth between a pair of bail supporting arms (only one is shown) 106 provided on the rotor 105, by the winding operation of the handle 104. A fishing line is wound uniformly and held around the spool 107, which is moved back and forth, by means of a fishing line guidemember (not shown) which is provided on one bail supporting arm.

In the above-described construction, protective members (attached parts) 113 and 116 are respectively attached and fixed to a rear end portion of the reel body 103 serving as the main body member as well as the bail supporting arm 106 of the rotor 105 by means of screws (fixing members) 120.

Figure 4B:
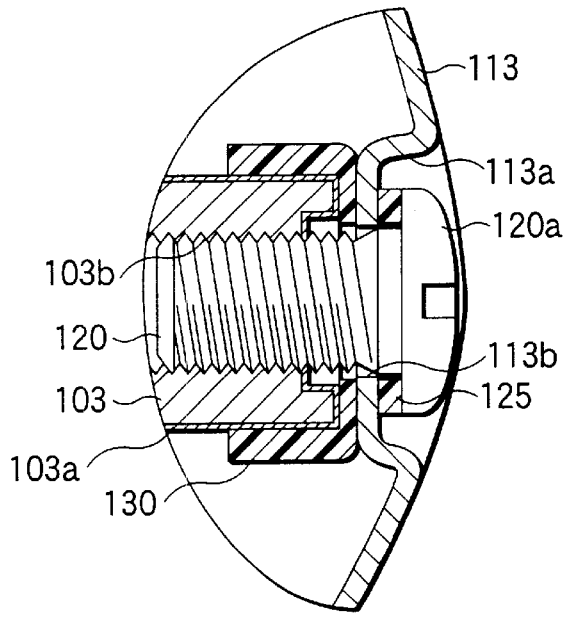
FIG. 4B is a cross-sectional view illustrating a structure for mounting a protective member which is attached to the rear of a reel body of the fishing spinning reel shown in FIG. 4A.

FIG. 4B is a cross-sectional view illustrating the structure for mounting the protective member 113.

The reel body 103 uses as a base material a base metal such as an aluminum alloy or a magnesium alloy, and is formed by coating it with an insulating coating 103a. An internally threaded portion 103b, into which the screw 120 for assembling the protective member is threadedly inserted, is formed at a predetermined position thereof. In this case, an insulating coating is also formed on the surface of the internally threaded portion 103b.

The protective member 113 is formed of a precious metal such as stainless steel, titanium, or the like, and a recessed portion 113a and a screw hole 113b are formed in a portion where the screw 120 is fixed. Meanwhile, the screw 120 is formed of a base metal similar to the material of the reel body, e.g., an aluminum alloy, a zinc alloy, or the like (an insulating layer may be formed on its surface).

In the above-described construction, when the screw 120 is attached, an insulating portion 125 for insulating electrical conduction between the protective member 113 and the screw 120 is provided between the two members. In this embodiment, the insulating portion 125 is formed as a resin-made collar (resin washer). The arrangement provided is such that when the two members are fixed, as the insulating portion 125 is interposed between a head 120a of the screw 120 and the surface of the protective member 113, an insulation is formed between the head 120a and the protective member 113 when the screw 120 is tightened.

The insulating portion 125 is sufficient if it is arranged to the screw 120 and the protective member 113. For example, it is possible to adopt an arrangement in which the entire surface of the protective member 113 or the surface portion of the recessed portion 113a of the protective member 113 is provided with a resin coating or a rubber coating, or an arrangement in which an adhesive for exhibiting an insulating function is allowed to flow between the two members.

As described above, since the screw 120, for fixing the protective member 113 formed of a precious metal to the main body member (reel body 103) formed of a base metal protected by the insulating coating 103a, is formed of a base metal, the potential difference between the screw 120 and the main body member becomes small, so that it is possible to suppress electric corrosion of the reel body 103. When the screw 120 is tightened, even if the insulating coating 103a coated on the surface of the internally threaded portion 103b or in the vicinity thereof is peeled off, since the insulating portion 125 for preventing electric conduction is provided between the screw 120 and the protective member 113, it is possible to avoid electric conduction between them via the screw 120. Consequently, it becomes possible to effectively prevent the electric corrosion of the main body member formed of the base metal.

With the above-described mounting structure, it is preferable to further interpose an insulating member 130 between the main body member (reel body 103) and the protective member 113. By interposing such an insulating member 130, it is possible to avoid scoring which can occur in assembling them, thereby making it possible to prevent electric corrosion reliably.

In the above-described construction, a base metal means a material which exhibits a large ionization tendency, and magnesium, aluminum, a magnesium alloy, an aluminum alloy, zinc, a zinc alloy, or the like corresponds to it.

The screw 120 requires strength for fixation, the screw 120 is preferably formed of an aluminum alloy, zinc, a zinc alloy, or the like, components of iron, copper, nickel, titanium, and the like may be added to them at predetermined wt. % or less.

As the base metal for forming the main body member, it is preferable to use a magnesium alloy. The magnesium alloy, although exceptionally lightweight among base metals, has conventionally been difficult to use for a fishing gear since electric corrosion is likely to occur. However, by providing the above-described arrangement, it becomes possible to effectively prevent electric corrosion. Consequently, it is easily possible to realize a fishing gear which is lightweight and has high rigidity and high durability, and it becomes possible to substantially alleviate the burden on an angler.

In the above-described construction, the concept of the precious metal includes one in which the member itself is formed of a precious metal, and one in which an arbitrary metal or resin is used as a base material and its surface is coated with a precious metal material by various known techniques such as plating and vapor deposition. The precious metal means a material having a small ionization tendency and, for example, gold, silver, nickel, titanium, chromium, a titanium alloy, copper, a copper-base alloy, iron, an iron-base alloy, and the like correspond to it. These precious metals have high durability and strength, and in the case of the reel these metals are frequently used as protective members in portions which are likely to come into contact with other objects.

Figure 5:
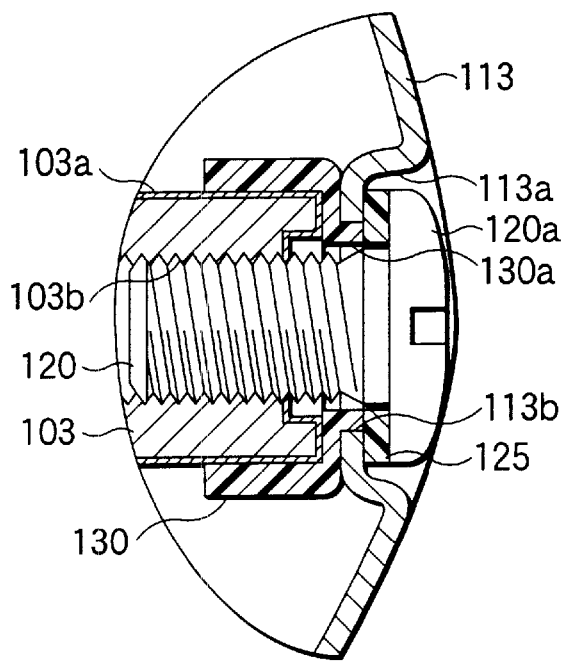
FIG. 5 is a cross-sectional view illustrating a second example of the construction of the structure for mounting the protective member in the fishing spinning reel shown in FIG. 4B.

FIG. 5 is a cross-sectional view illustrating a second example of the construction of the structure for mounting a protective member in the above-described fishing spinning reel.

In this example of construction, a cylindrical projection 130a is formed in advance on the insulating member 130 shown in FIG. 4B, and this projection 130a is located in the screw hole 113b formed in the protective member 113, so that the contact between the protective member 113 and the screw 120 is reliably prevented in the screw hole 113b.

According to such a mounting structure, in the construction shown in FIG. 4B, even if there is a dimensional error or the like in the protective member 113 and the screw 120, electrical conduction between the two members is reliably prevented. Therefore, electric corrosion of the main body member can be prevented more reliably than in the case of the mounting structure shown in FIG. 4B.

Figure 6:
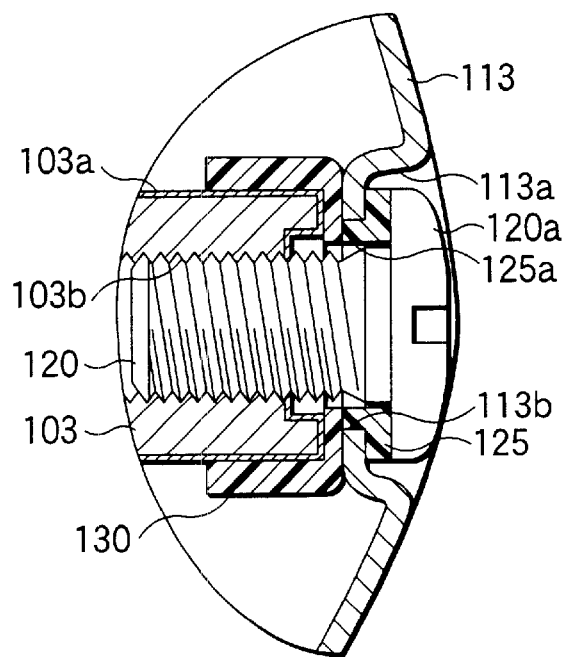
FIG. 6 is a cross-sectional view illustrating a third example of the construction of the structure for mounting the protective member in the fishing spinning reel shown in FIG. 4B.

FIG. 6 is a cross-sectional view illustrating a third example of the construction of the structure for mounting a protective member in the above-described fishing spinning reel.

In the mounting structure shown in FIG. 4B, as the insulating portion 125 the resin color is interposed between the head 120a of the screw 120 and the surface of the protective member 113. However, in the mounting structure shown in FIG. 6, a cylindrical projection 125a is formed in advance on the resin color for forming the insulating portion 125, and this projection 125a is located in the screw hole 113b formed in the protective member 113, so that the contact between the protective member 113 and the screw 120 is reliably prevented in the screw hole 113b as well.

According to such a mounting structure, in the same way as the construction shown in FIG. 5, electrical conduction between the protective member 113 and the screw 120 is reliably prevented, and electric corrosion of the main body member can be prevented more reliably.

Figure 7:
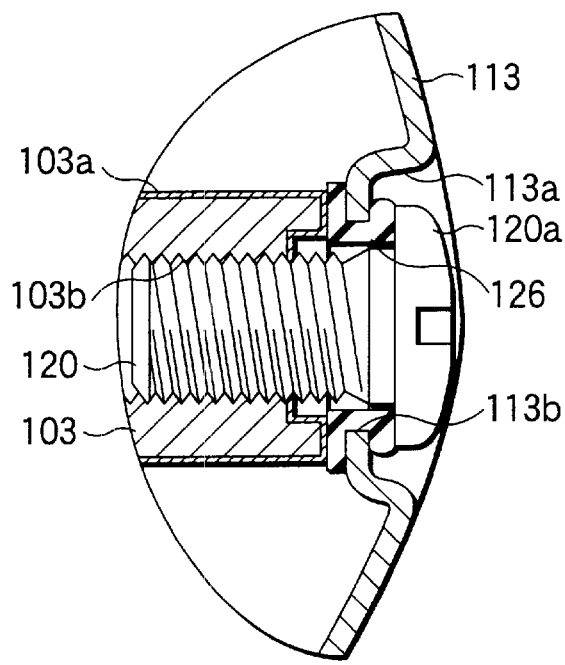
FIG. 7 is a cross-sectional view illustrating a fourth example of the construction of the structure for mounting the protective member in the fishing spinning reel shown in FIG. 4B.

FIG. 7 is a cross-sectional view illustrating a fourth example of the construction of the structure for mounting a protective member in the above-described fishing spinning reel.

In the above-described mounting structures, the insulating member 130 is interposed between the reel body 103 (main body member) and the protective member 113. However, an arrangement may be provided such that the insulating portion provided between the protective member 113 and the screw 120 also functions as such an insulating member 130.

Namely, an insulating portion 126 shown in FIG. 7 is formed of an elastically deformable basic material including an elastomer such as rubber or silicon rubber, and a resin such as urethane or nylon. The insulating portion 126 is formed in such a manner as to cover both surfaces of the protective member 113 and the inner peripheral surface of the screw hole in the vicinity of the screw hole 113b formed in the protective member 113, and is adapted to be press-fitted and fixed in advance in the screw 113b. The protective member 113 is positioned on the reel body 103 (main body member), and if the screw 120 is tightened in this state, electrical conduction is insulated between the protective member 113 and the screw 120 and between the protective member 113 and the reel body 103.

According to the above-described mounting structure, it becomes possible to further simplify the construction of the insulating portion and the insulating member in the above-described mounting structure.

Figure 8:
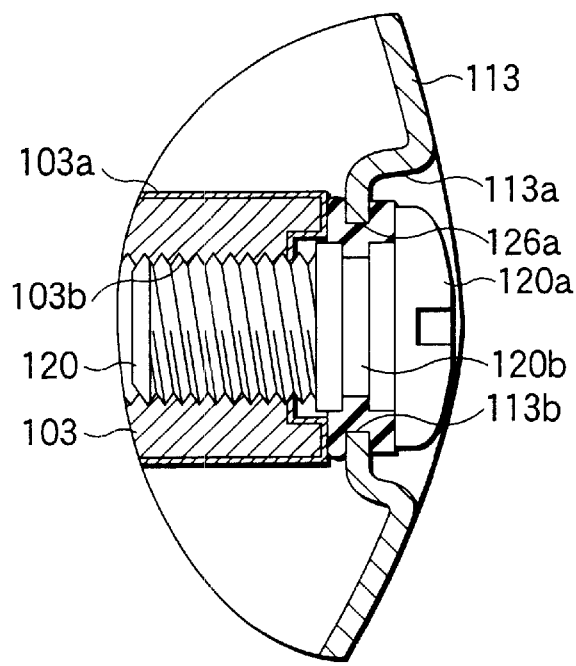
FIG. 8 is a cross-sectional view illustrating a fifth example of the construction of the structure for mounting the protective member in the fishing spinning reel shown in FIG. 4B.

FIG. 8 is a cross-sectional view illustrating a fifth example of the construction of the structure for mounting a protective member in the above-described fishing spinning reel.

In the mounting structure shown in FIG. 7, the insulating portion 126 is press-fitted and fixed in the screw hole 113b formed in the protective member 113. However, in this example of construction a circumferential groove 120b is formed in advance in a shaft portion of the screw 120, an insulating portion 126a similar to the aforementioned insulating portion 126 is press-fitted and fixed in this circumferential groove 120b, and the screw 120 is fixed in this state.

With the above-described mounting structure as well, it is possible to obtain operational advantages similar to those of the construction shown in FIG. 7.

Figure 9:
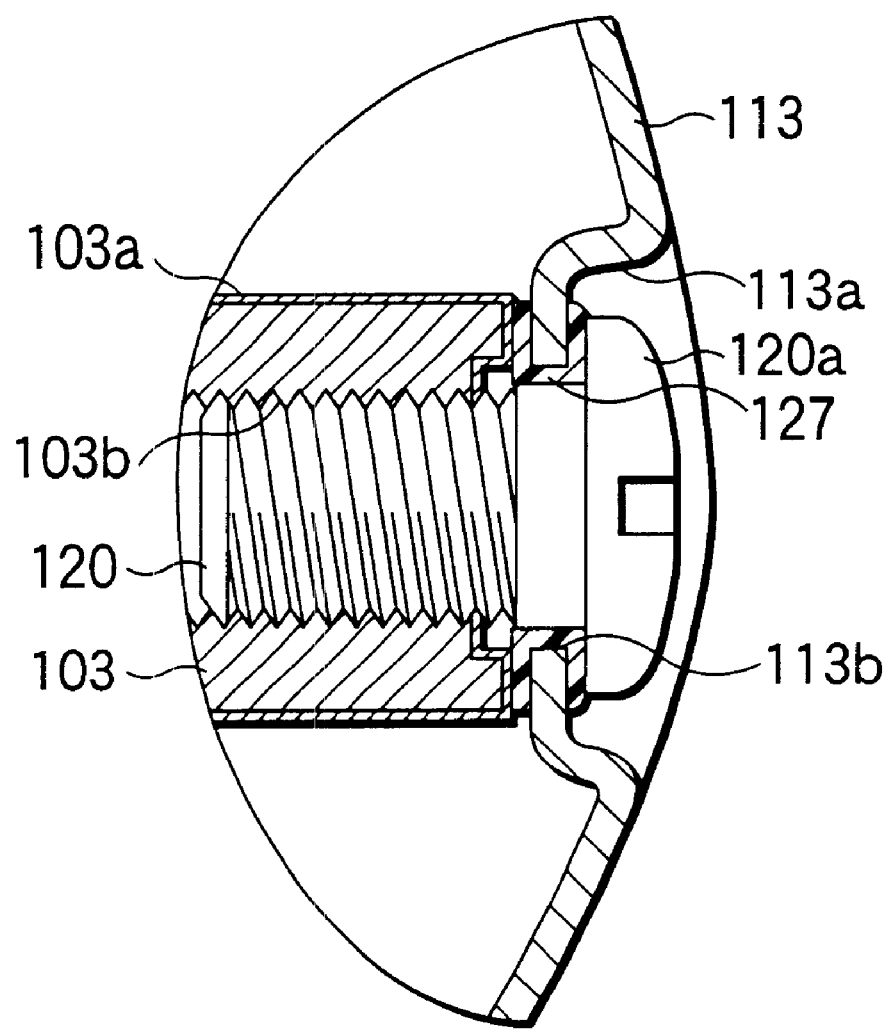
FIG. 9 is a cross-sectional view illustrating a sixth example of the construction of the structure for mounting the protective member in the fishing spinning reel shown in FIG. 4B.

FIG. 9 is a cross-sectional view illustrating a sixth example of the construction of the structure for mounting a protective member in the above-described fishing spinning reel.

As described above, the insulating portion for insulating electrical conduction between the protective member 113 and the screw 120 can be constructed by, for example, a resin-made collar interposed between the two members, a resin coating or a rubber coating formed on the surface of the protective member 113, or an adhesive filled to perform an insulating function between the two members.

In the mounting structure shown in FIG. 9, a coating 127 exhibiting insulating action is formed in a peripheral portion of the screw hole 113b in the protective member 113 at a position where the protective member 113 comes into contact with the other members (the screw 120 and the reel body 103). In this case, the coating 127 can be formed by providing in advance a coating on the surrounding portion of the screw hole 113b in the protective member 113 by using a rubber material, or by coating it with a urethane-base paint, an adhesive, or the like.

According to the above-described construction, it becomes possible to realize more simply the mounting structure having functions similar to those of the insulating portion and the insulating member mentioned above.

Figure 10A:
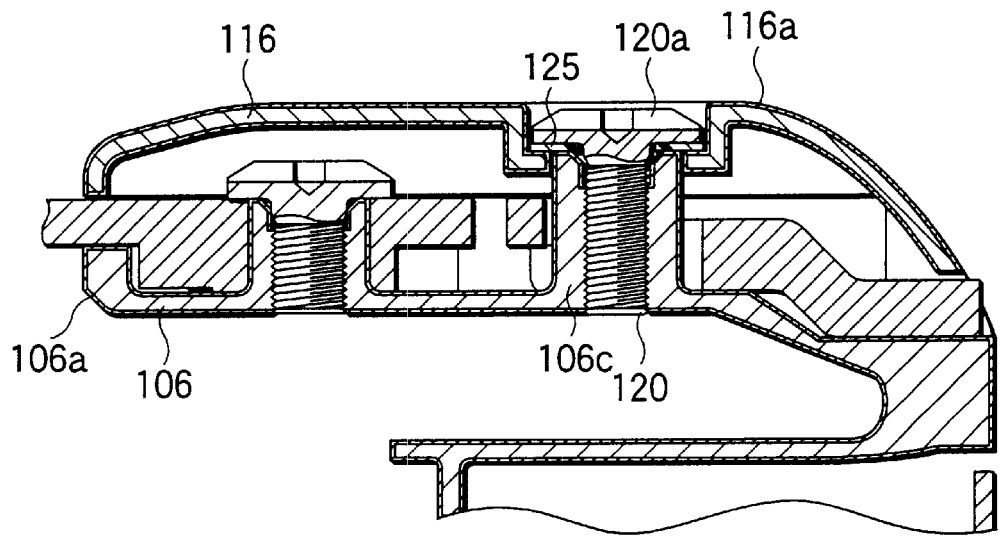
FIG. 10A is a cross-sectional view illustrating the structure for mounting a protective member which is attached to a bail supporting arm of the fishing spinning reel shown in FIG. 4A.
Figure 10B:
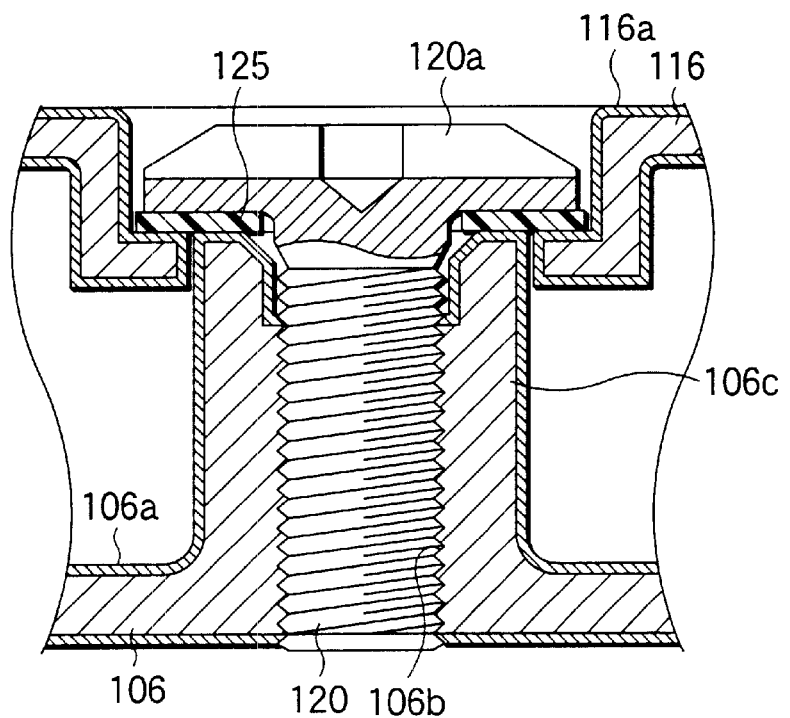
FIG. 10B is an enlarged view thereof.

FIG. 10A is a cross-sectional view illustrating the structure for mounting the protective member 116 which is attached to the bail supporting arm 106 of the fishing spinning reel shown in FIG. 4A, and FIG. 10B is an enlarged view thereof.

Here, the bail supporting arm 106 is formed as a main body member which is constructed such that a base metal such as an aluminum alloy or a magnesium alloy is used as the base material in the same way as described above, but an insulating coating 106a is coated thereon. The protective member 116 in which a precious metal 116a is coated on the resin material is fixed to this main body member (bail supporting arm) by means of the screw 120. In this case, a boss 106c having an internally threaded portion 106b is formed on and projected form the bail supporting arm 106, the protective member 116 is loosely fitted to the boss with a predetermined gap (in a state of noncontact), and in this state the screw 120 is threadedly inserted, thereby mounting the protective member 116.

In the above-described mounting structure as well, when the screw 120 is attached, the insulating portion 125 for insulating electrical conduction between the protective member 116 and the screw 120 is provided between the two members, specifically between the reverse surface of the head 120a of the screw 120 and the obverse surface of the protective member 116, thereby making it possible to avoid electrical conduction which is likely to occur between the screw 120 and the protective member 116. Consequently, it becomes possible to effectively prevent the electric corrosion of the man body member (bail supporting arm 106) formed of the base metal.

In this mounting structure, the insulating portion 125 is interposed between the reverse surface of the head 120a of the screw 120 and the obverse surface of the boss 6c, and electrical conduction between the two members is prevented. At the same time, the protective member 116 and the bail supporting arm 106 are maintained in a state of non-contact so as to ensure that electrical conduction does not occur between the two members even if peeling off occurs due to scoring or the like.

Incidentally, in the above-described construction as well, the insulating portion 125 may be modified variously, as described above. In addition, apart from forming the gap, the insulating member 130 such as the one shown in FIG. 4B may be interposed between the boss 106c of the bail supporting arm 106 and the protective member 116.

Figure 11:
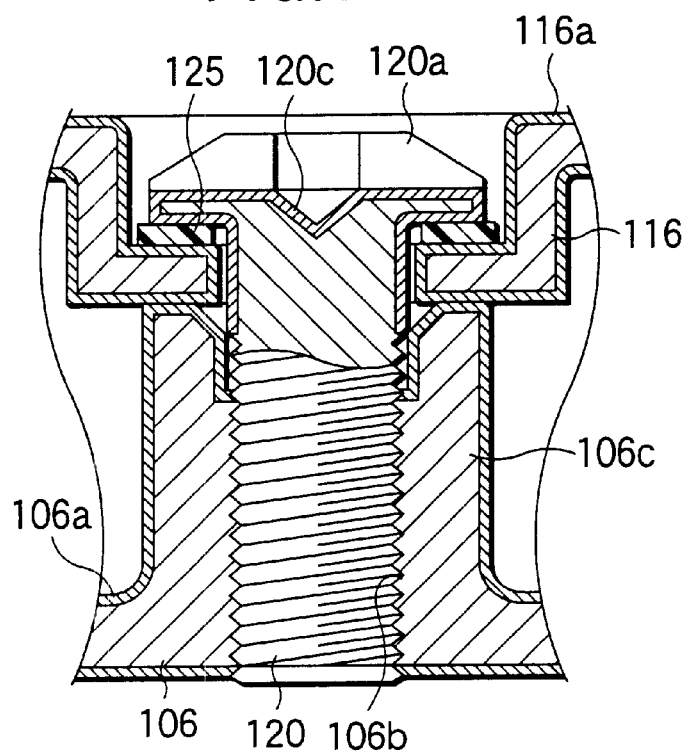
FIG. 11 is a cross-sectional view illustrating another example of the structure for mounting a protective member which is attached to the bail supporting arm of the fishing spinning reel shown in FIG. 4A.

FIG. 11 is a diagram illustrating another example of construction of the structure for mounting the protective member 116 on the bail supporting arm.

In this mounting structure, an insulating coating 120c is formed in advance on the head 120a of the screw 120, particularly the reverse surface side coming into contact with the protective member, by using rubber, a resin, or the like. When such a screw 120 is tightened, the insulating portion 125 is interposed at a portion having the possibility of undergoing friction with the protective member, specifically between the reverse surface of the head 120a of the screw 120 and the protective member 116.

With the above-described mounting structure, it is possible to obtain operational advantages similar to those of the above-described constructions. Further, it becomes possible to prevent more reliably electrical conduction between the screw 120 and the protective member 116.

Incidentally, although in this mounting structure the protective member 116 is in a state of being mounted on the surface of the boss 106c as shown in the drawing, an insulating member may be separately interposed as described above. Alternatively, the protective member 116 may be loosely fitted with a gap, as shown in FIG. 10B.

Figure 12:
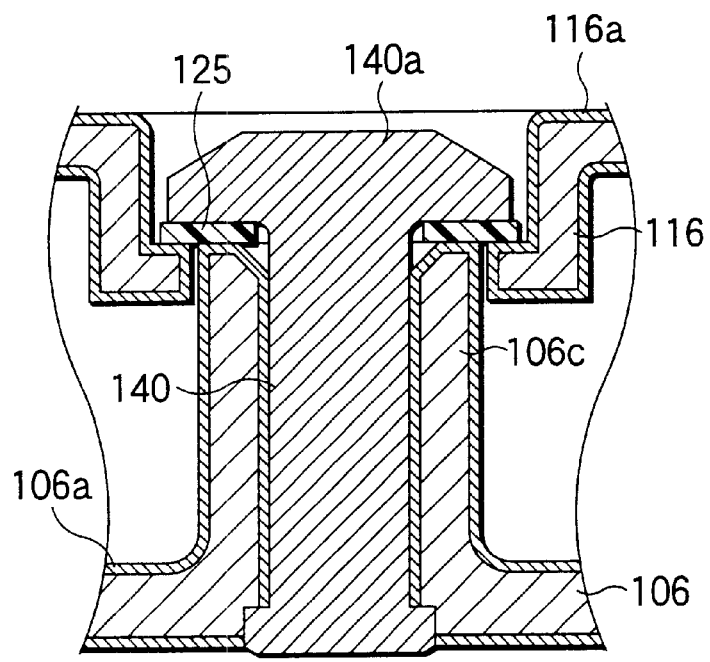
FIG. 12 is an enlarged cross-sectional view illustrating a modification of a fixing member shown in FIG. 10B.

FIG. 12 is a diagram illustrating a modification of the fixing member.

Although the screw is used as the fixing member in the example of construction shown in FIG. 10B, a rivet 140 formed of, for example, a base metal material may be used as the fixing member, as shown in this drawing. Further, also in the case where such a rivet is used as the fixing member, it suffices if the insulating member 125 is provided between a head 140a of the rivet 140 and the protective member 116 in the same way as described above.

According to the fishing reel having the above-described structure for mounting the protective member, it becomes possible to provide an arrangement which is lightweight, excellent in maneuverability, and outstanding in durability.

Although the embodiment of the invention has been described by way of example, the invention is also applicable to fishing gears such as a fishing rod and a fishing-rod holder other than the fishing reel. Additionally, the main body member and the attached part in the invention are merely defined in the connection between a member formed of a base metal and a precious metal part which is attached thereto, and should not be defined by the nomenclature of the components which make up the fishing gear.

According to the invention, it is possible to obtain a fishing gear of the construction in which electrical corrosion is difficult to occur in the main body portion in the fishing gear in which the attached part is assembled onto the main body member, which is formed of a base metal protected by an insulating coating, by means of a fixing member such as a screw.

According to the invention, it is possible to obtain a fishing gear of the construction in which electrical corrosion is difficult to occur in the fishing gear in which the attached part formed of a precious metal, or the attached part in which a precious metal coating is formed on a base material, is assembled onto the member, which is formed of a base metal protected by an insulating coating, by means of a fixing member.

What is claimed is:

1. A fishing gear in which an attached part is assembled onto a main body member formed of a base metal protected by an insulating coating comprising:

a fixing member, for fixing the attached part to the main body member, formed of an aluminum alloy in which an Fe component is 0.6 wt. % or less, a Cu component is 0.2 wt. % or less, an Ni component is 0.1 wt. % or less, and a Ti component is 0.03 wt. % or less.

2. The fishing gear according to claim 1, wherein the fishing gear is a fishing reel for winding and holding a fishing line.

3. The fishing gear according to claim 1, wherein the base metal forming the main body member is one of a magnesium alloy and an aluminum alloy.

4. The fishing gear according to claim 1, wherein the attached part is formed of a precious metal.

5. The fishing gear according to claim 1, wherein the attached part is formed of a resin coated by a precious metal.

6. A fishing gear in which an attached part formed of a precious metal is assembled onto a main body member formed of a base metal protected by an insulating coating comprising:

a fixing member, for fixing the attached part to the main body member, formed of a base metal; and a insulating portion, for insulating electrical conduction, provided between the fixing member and the attached part.

7. The fishing gear according to claim 6, wherein an insulating member is interposed between the main body member and the attached part.

8. The fishing gear according to claim 7, wherein the insulating member prevents contact between the attached part and the fixing member.

9. The fishing gear according to claim 6, wherein the insulating portion provides insulation between the main body member and the attached part.

10. The fishing gear according to claim 6, wherein the fishing gear is a fishing reel for winding and holding a fishing line.

11. The fishing gear according to claim 6, wherein the base metal forming the main body member is one of a magnesium alloy and an aluminum alloy.

12. The fishing gear according to claim 6, wherein the attached part is formed of a resin coated by the precious metal.

* * * * *